(12) United States Patent
Gozloo et al.

(10) Patent No.: US 10,063,389 B2
(45) Date of Patent: Aug. 28, 2018

(54) IDENTIFYING AND CONFIGURING MULTIPLE SMART DEVICES ON A CAN BUS

(71) Applicant: CATERPILLAR INC., Peoria, IL (US)

(72) Inventors: Bahman Gozloo, Peoria, IL (US); Jeffrey Michael Thate, Washington, IL (US)

(73) Assignee: Caterpillar Inc., Deerfield, IL (US)

( * ) Notice: Subject to any disclaimer, the term of this patent is extended or adjusted under 35 U.S.C. 154(b) by 103 days.

(21) Appl. No.: 15/203,988

(22) Filed: Jul. 7, 2016

(65) Prior Publication Data

US 2018/0013578 A1    Jan. 11, 2018

(51) Int. Cl.
| | |
|---|---|
| G06F 11/00 | (2006.01) |
| H04L 12/40 | (2006.01) |
| G06F 3/06 | (2006.01) |
| G06F 11/22 | (2006.01) |
| G06F 11/30 | (2006.01) |

(52) U.S. Cl.
CPC ...... *H04L 12/40013* (2013.01); *G06F 3/0619* (2013.01); *G06F 3/0655* (2013.01); *G06F 3/0688* (2013.01); *G06F 11/2215* (2013.01); *G06F 11/3027* (2013.01)

(58) Field of Classification Search
CPC .... G06F 3/0619; G06F 3/0655; G06F 3/0688; G06F 11/2215; G06F 11/3027; H04L 12/40013
See application file for complete search history.

(56) References Cited

U.S. PATENT DOCUMENTS

| | | |
|---|---|---|
| 5,404,460 A | 4/1995 | Thomsen et al. |
| 5,914,957 A | 6/1999 | Dean et al. |
| 6,738,920 B1 | 5/2004 | Horne |
| (Continued) | | |

*Primary Examiner* — Joshua P Lottich
(74) *Attorney, Agent, or Firm* — Finnegan, Henderson, Farabow, Garrett & Dunner, LLP; James S. Bennin

(57) ABSTRACT

A system for communicating over a Controller Area Network (CAN) bus may include a central controller and a plurality of smart devices communicatively coupled with the central controller over the CAN bus and over an identification verification network separate from the CAN bus. Each smart device may be configured to at least one of measure various parameters and control a function based on a command received from the central controller, and then communicate one or more signals indicative of at least one of the measured parameters and the function over the CAN bus to the central controller. Each of the smart devices may include a physical input, a physical output, and at least two non-volatile memory locations. A first of the at least two memory locations may be configured to store an identifier input signal received at the physical input from at least one of the central controller and an upstream smart device over the identification verification network, the identifier input signal being stored by the smart device as a function instance value for the smart device. The smart device may further include a source address determination module configured to determine a source address for the smart device based on the function instance value and a factory default base address for the smart device, and store the source address in a second of the at least two memory locations.

20 Claims, 6 Drawing Sheets

(56) References Cited

U.S. PATENT DOCUMENTS

| | | |
|---|---|---|
| 7,255,098 B1 | 8/2007 | Boley et al. |
| 7,565,470 B2 | 7/2009 | Lin |
| 8,700,814 B2 | 4/2014 | Zhang |
| 9,694,827 B2 * | 7/2017 | Tran .................. B60W 50/0225 |
| 2003/0171828 A1 * | 9/2003 | Capps ........................ G06F 1/26 |
| | | 700/22 |
| 2005/0049021 A1 * | 3/2005 | Nedelcu ................ H04W 36/32 |
| | | 455/575.9 |

* cited by examiner

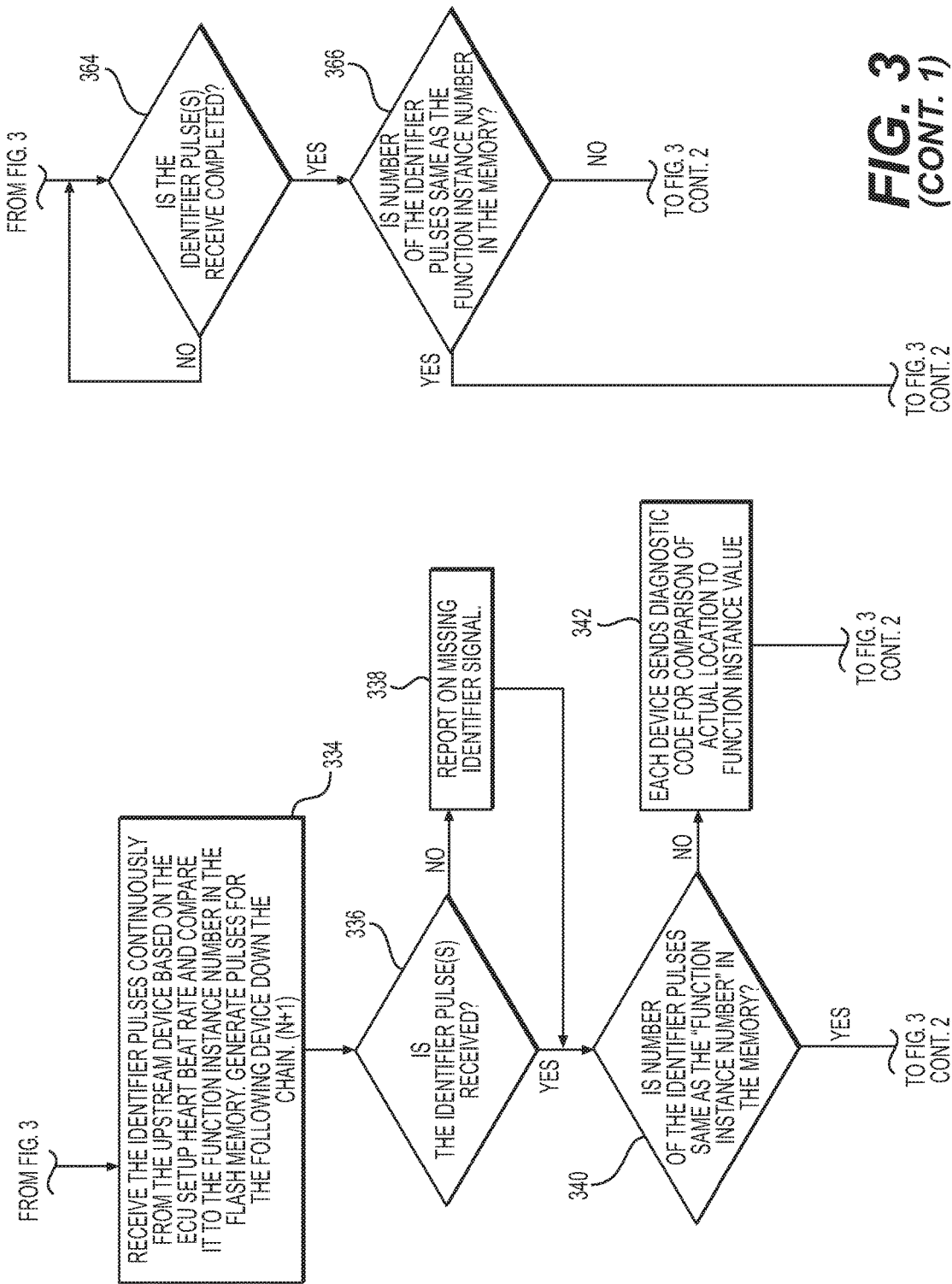
FIG. 3 (CONT. 1)

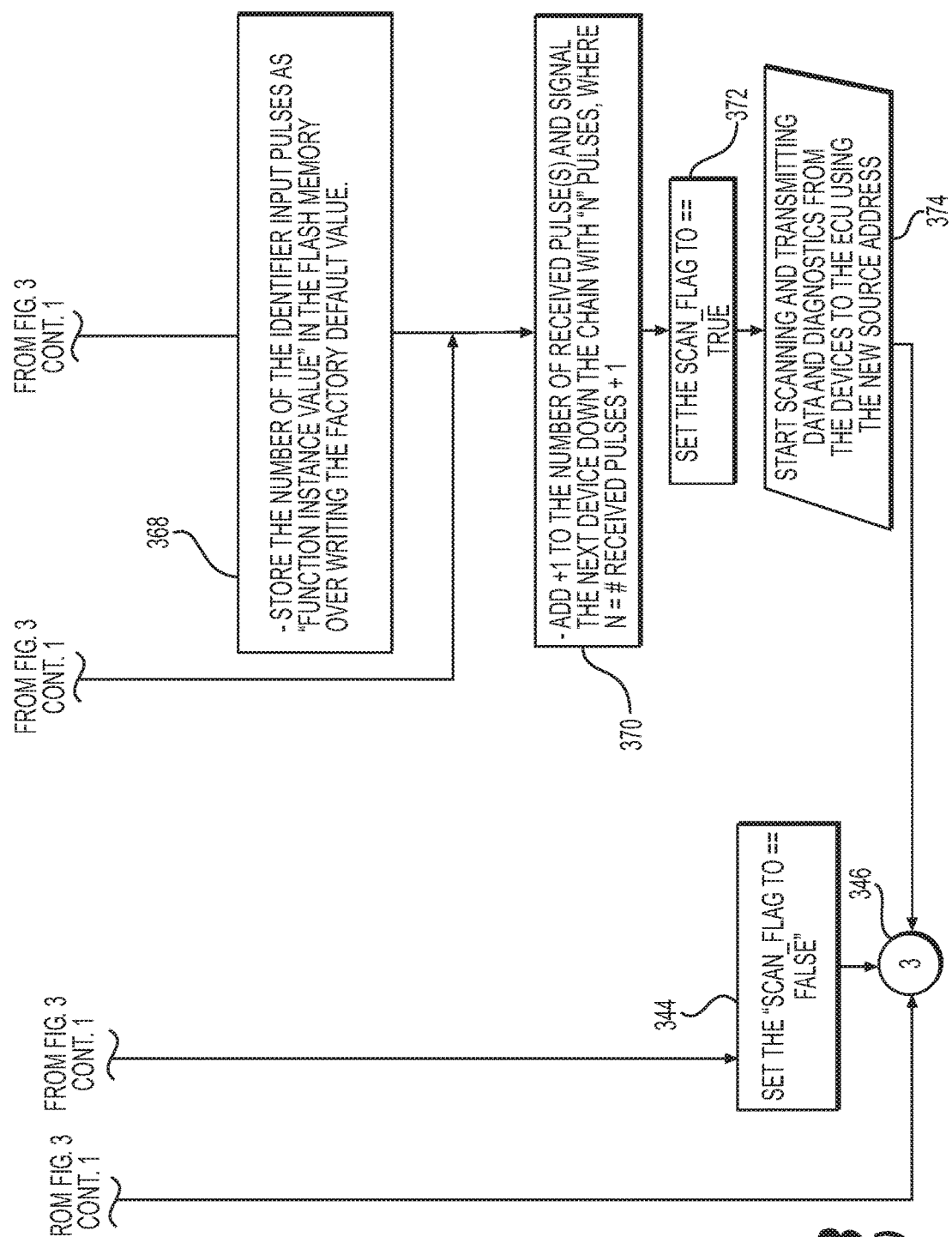
FIG. 3 (CONT. 2)

IDENTIFYING AND CONFIGURING MULTIPLE SMART DEVICES ON A CAN BUS

TECHNICAL FIELD

The present disclosure is directed to a method and system for identifying and configuring multiple smart devices and, more particularly, to a method and system for identifying and configuring multiple smart devices connected to a CAN bus.

BACKGROUND

A Controller Area Network (CAN) bus is an internal communications network often used to interconnect microcontrollers and other smart devices inside a vehicle. Special requirements for vehicle control such as assurance of message delivery, of non-conflicting messages, of minimum time of delivery, of low cost, of electromagnetic field (EMF) noise resilience, and of redundant routing and other characteristics mandate the use of common networking protocols such as CAN. A CAN bus is a vehicle bus standard designed to allow microcontrollers and other smart devices to communicate with each other in applications without a host computer. CAN bus is a message-based protocol used for multiplex electrical wiring within vehicles and in other contexts.

Many applications that use a CAN bus require multiple identical smart devices on the same CAN bus to each be associated with a specific location for control of a function or measurement of a certain parameter such as temperature, pressure, flow rate, or other operational characteristics of the vehicle. In one example, multiple identical temperature sensors may be located at each of 20 different cylinders in a diesel engine, and at each of first and second turbocharger inlets and exits. The system must include a way to ensure that data received from each of the identical temperature sensors can be associated with the actual location of the corresponding sensor. In one solution, the sensors or other smart devices may be provided with multiple part numbers, with each part number being associated with a unique source address or function instance number. However, this method adds unnecessary burden on customers to carry large inventories of part numbers for multiple identical devices. Keeping track of all the different part numbers for multiple identical devices may also lead to errors when servicing the identical devices in the field.

In another solution for identifying and configuring multiple identical smart devices that are connected to the same CAN bus, each of the devices may be provided with different numbers of input pins that may be associated with different harness-codes or location codes. In this way, each of the otherwise identical smart devices may be hardwired to a particular location code via its harness when the device is plugged in. Providing different numbers of input pins for each device may eliminate errors associated with mislocation of a particular device, but this solution also requires larger connectors to handle the additional pins. Moreover, as the number of devices increases in an application, the costs associated with the increases in the number of input pins and harness interconnections also increase. Furthermore, if the harness that is associated with a particular location code corrodes, or fails due to vibration, the device connected to the harness may assume an incorrect source address and may execute functions or supply data that may lead to unsafe conditions.

In yet another solution for identifying and configuring multiple identical smart devices that are connected to the same CAN bus, each device may be provided with one analog input and may be connectable to a harness with in-harness resistors having different values for each different location. When a device is connected to a particular harness, voltage dividing is performed for each device input, and based on the measured voltage value at this input the device is able to identify itself and assume the required name or source address from a fixed preprogrammed list stored in a memory. However, just as with the method described above, this method has the drawback that in-harness resistor connection failure can result in an incorrect source address and execution of functions or supply of data that may lead to unsafe conditions.

U.S. Pat. No. 5,914,957 to Dean et al. (the '957 patent) discloses a node configuration system with identical nodes that are connected to a master through a shared communication link or bus, and an unshared, daisy chain communication link. The master assigns a unique identifier to each of the servant nodes sequentially and individually. However, the system of the '957 patent has no way of knowing if any particular slave device provided with a unique identifier has been moved to a new location. Therefore, data received from a device that has been accidentally installed in the wrong location would still be associated with the assumed correct location of the device, thereby potentially resulting in controls that are based on incorrect information and may cause unsafe conditions.

The control system of the present disclosure addresses one or more of the problems set forth above and/or other problems of the prior art.

SUMMARY

One aspect of the present disclosure is directed to a system for communicating over a Controller Area Network (CAN) bus. The system may include a central controller, and a plurality of smart devices communicatively coupled with the central controller over the CAN bus and over an identification verification network separate from the CAN bus. Each smart device may be configured to at least one of measure various parameters and control a function based on a command received from the central controller, and then communicate one or more signals indicative of at least one of the measured parameters and the function over the CAN bus to the central controller. Each of the smart devices may include a physical input, a physical output, and at least two nonvolatile memory locations. A first of the at least two memory locations may be configured to store an identifier input signal received at the physical input from at least one of the central controller and an upstream smart device over the identification verification network, the identifier input signal being stored by the smart device as a function instance value for the smart device. The smart device may further include a source address determination module configured to determine a source address for the smart device based on the function instance value and a factory default base address for the smart device, and store the source address in a second of the at least two memory locations.

Another aspect of the present disclosure is directed to a method of identifying and configuring a plurality of identical smart devices communicatively coupled to a central controller over a common CAN bus. The method may include connecting the smart devices together and to the central controller in series to form a daisy chain identification verification network separate from the CAN bus, each of the smart devices being configured for at least one of measuring various parameters and controlling a function based on a command received from the central controller. The method may further include communicating one or more signals indicative of at least one of the measured parameters and the function from the smart devices over the CAN bus to the central controller. The method may still further include storing an identifier input signal received at a physical input of each of the smart devices from at least one of the central controller and an upstream smart device over the identification verification network, the identifier input signal being stored by each smart device in a first memory location of the smart device as a function instance value for the smart device. The method may also include determining a source address for each smart device using a source address determination module by determining the source address for the smart device based on the function instance value stored in the first memory location and a factory default base address for the smart device, and storing the source address in a second memory location of the smart device.

Yet another aspect of the present disclosure is directed to a method of automatically identifying and correcting at least one of a fault or a misconnection in one or more of a plurality of identical smart devices communicatively coupled to a central controller over a common CAN bus. The method may include connecting the smart devices together and to the central controller in series to form a daisy chain identification verification network separate from the CAN bus, each of the smart devices being configured for at least one of measuring various parameters and controlling a function based on a command received from the central controller. The method may include communicating one or more signals indicative of at least one of the measured parameters and the function from the smart devices over the CAN bus to the central controller. The method may further include storing an identifier input signal received at a physical input of each of the smart devices from at least one of the central controller and an upstream smart device over the identification verification network, the identifier input signal being stored by each smart device in a first memory location of the smart device as a function instance value for the smart device. The method may still further include determining a source address for each smart device using a source address determination module by determining the source address for the smart device based on the function instance value stored in the first memory location and a factory default base address for the smart device, and storing the source address in a second memory location of the smart device. The method may also include repeatedly resending an identifier input signal from the central controller to the physical input of the first smart device connected to the central controller in the daisy chain and receiving an identifier output signal from a physical output of the last smart device connected to the central controller in the daisy chain to identify any faults, correct or report any faults, and check that all of the smart devices are reporting for the correct location. An elapsed time after sending an identifier input signal may be monitored by the central controller, and a fault code may be flagged by the central controller when one or more smart devices do not receive an identifier input signal within a threshold period of time.

DETAILED DESCRIPTION

Figure 1:
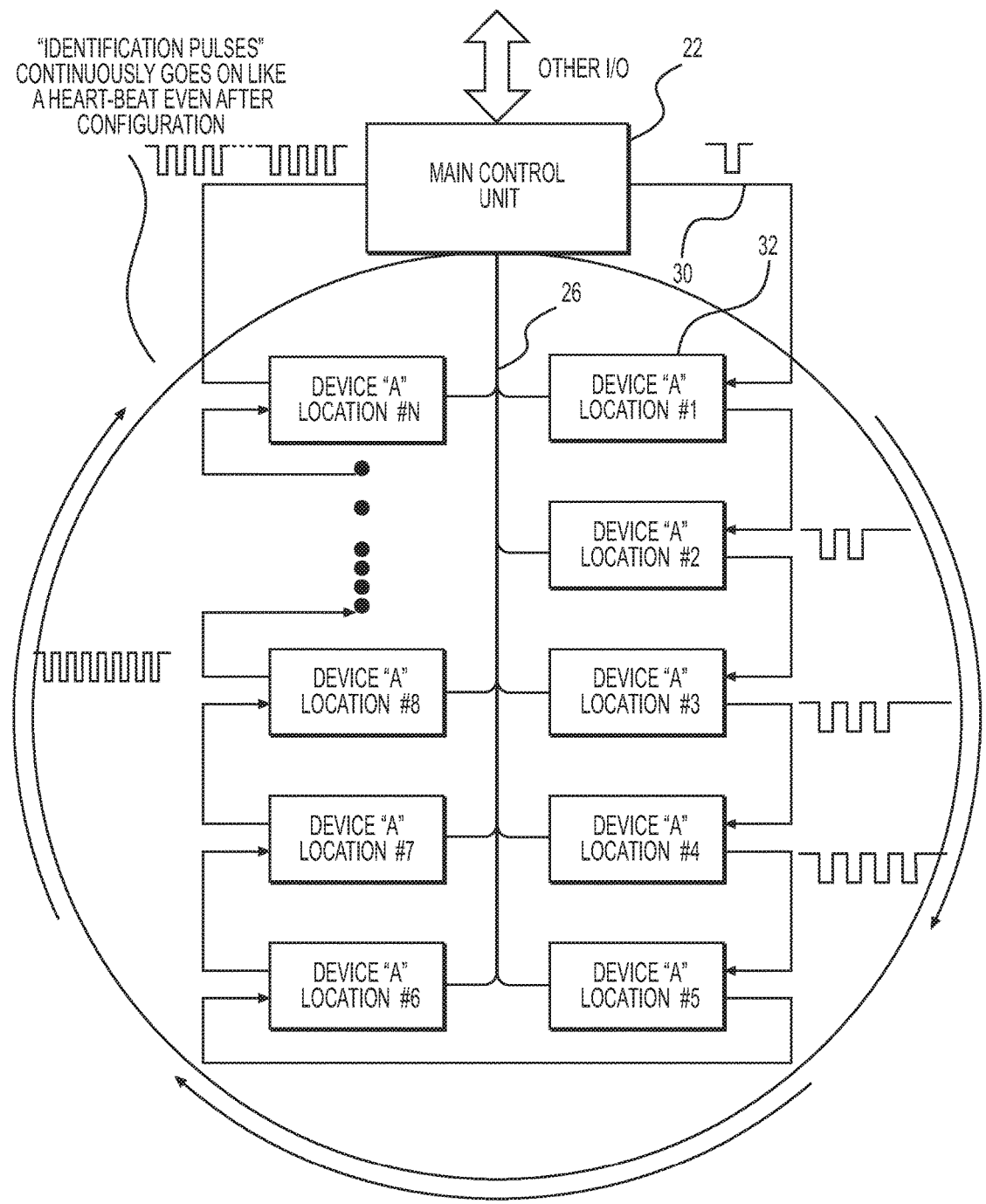
FIG. 1 is a diagrammatic illustration of an exemplary system according to this disclosure.

FIG. 1 illustrates an exemplary system in accordance with various embodiments of this disclosure in which a central controller (main control unit) 22, such as an electronic control unit (ECU) on a vehicle, and multiple smart devices 32, such as temperature sensors, are connected to the same CAN bus 26 at a plurality of locations on the vehicle. A smart device may be any device that is capable of measuring various parameters and communicating the information over the CAN bus to the central controller. Alternatively or in addition, a smart device may be a control module in a distributed system that is performing or controlling a specific function based on a command received from the central controller. Smart devices 32 may be identical devices or nearly identical devices that are not readily distinguishable, and that are required to communicate over the same serial communication bus for a variety of reasons including cost constraints, space constraints, system simplification, and reduction in the total amount of wiring on the vehicle. Although various exemplary embodiments are described for connecting multiple devices to a CAN bus, one of ordinary skill in the art will recognize that many of the same concepts can be applied to other serial communication buses interconnecting multiple identical devices that provide or receive data associated with unique addresses. Each of the devices must be assigned a unique source address so that information specific to a particular location on the vehicle can be communicated over the same CAN bus without misidentification or conflict with information specific to different locations. The system and methods in accordance with various implementations of this disclosure facilitate efficient and automatic self-assignment and self-correction of location codes or function instance values and source addresses for all of the devices interconnected to a common CAN bus and central controller in a system installation.

Each smart device 32 is capable of communicating over CAN bus 26, and also over a separate identification verification network 30 that may comprise smart devices 32 connected together and to central controller 22 in a series loop (or daisy chain), as shown in FIG. 1. Each smart device 32 may include one physical input connection (digital or analog) that is capable of detecting a signal pulse count, a pulse-width modulated (PWM) signal, a frequency, or any predefined signal protocol that can be used to encode and interpret simple location or position information of the device in a system installation (referred to herein as an identifier input or identifier input signal). The protocol for selecting the type of identifier input signal that will be communicated to each smart device may depend on the smart device capabilities, complexity, cost, or preference.

In addition to the on-board specific application software that a smart device may include, one or more processors configured with embedded software, firmware, and/or hardware on each smart device may also be configured to receive and read the identifier input signal and interpret the signal as an indication of the current location of the smart device. The indication of the current location of the smart device may be referred to as the "function instance value" or "location code" for that smart device. The smart device may also be configured to store the identifier input signal in a flash/

EEPROM memory location (nonvolatile memory). Each smart device may still further include a physical output (Digital or Analog) configured to send a generated location or position signal to the next device connected downstream in the system installation. In the daisy chain configuration of the identification verification network in accordance with various embodiments of this disclosure, each smart device only receives an identifier input signal from the immediate upstream device. The immediate upstream device may be another smart device or, in the case of the first smart device in the daisy chain, the central controller. In alternative embodiments, the direction of communication between smart devices and the central controller in the daisy chain arrangement may be switched from "clockwise" to "counterclockwise", such that the physical input and physical output of each smart device are switched, and a smart device or central controller that was previously located immediately downstream of another smart device may become located immediately upstream of that smart device. The signal that is communicated from the physical output of a smart device downstream to the next smart device or to the central controller may be referred to as an identifier output signal.

Each smart device may include at least two nonvolatile memory locations, a first of the at least two memory locations being configured to store the identifier input signal received at the physical input from at least one of the central controller and an upstream smart device over the identification verification network. The identifier input signal may be stored by the smart device as a function instance value for the smart device. The smart device may further include a source address determination module configured to determine a source address for the smart device based on the function instance value and a factory default base address for the smart device. The source address determination module may be further configured to store the source address in a second of the at least two memory locations.

In one exemplary embodiment of the system according to this disclosure, the source address determination module for at least one smart device may be configured to use the function instance value for the smart device and the factory default base address to communicate with the central controller. The central controller may be configured to perform a source address arbitration process to generate a new source address for the smart device, and send that new source address back to the smart device. The smart device may be configured to receive and store the new source address generated by the central controller in the second of the at least two memory locations.

In another, alternative embodiment of the system according to this disclosure, the source address determination module for at least one of the smart devices may automatically generate a new source address for the at least one of the smart devices without involving the central controller by adding the function instance value for the smart device to the factory default base address and storing the resulting new source address in the second of the at least two memory locations.

Each of the smart devices may be further configured to add an incremental value to its function instance value and communicate the resulting incrementally increased function instance value as a new identifier input signal through the smart device physical output to a physical input of a successive smart device connected directly downstream of the smart device, or to a physical input of the central controller. Each smart device 32 may be further configured to process the identifier input signal received at the physical input from an upstream smart device 32, or in the case of the first smart device downstream from central controller 22 (Device "A" at Location #1 in FIG. 1), process the identifier input signal received directly from central controller 22. Each smart device 32 may be configured to process the received identifier input signal by adding an incremental value to the received signal and encoding the resulting value as that smart device's function instance value or location code. The incremental value may be one or more digital pulse count(s), a pulse width modulated (PWM) signal, or any pre-defined protocol or analog signal.

Each device may then send the incrementally increased signal out from the physical output for that device and downstream to the next device connected in the daisy chain identification verification network. This information dictates the function instance value or location code for the next device connected downstream in the system installation. The function instance value may also be used to generate the device "source address". Both the function instance value and the source address for each smart device may comprise at least part of an identification number for the smart device that provides a variety of information on the device, such as where the device is physically located, what the factory default base address for the device is before the device is configured for a particular application, factory information on other characteristics and capabilities of the smart device, etc. Each smart device may designate or reserve at least two nonvolatile memory locations. A first of the at least two memory locations may be designated or reserved for the function instance value specific to the location of the smart device. A factory default value (example "00") can be stored in this location by the manufacturer. A second memory location may be reserved for the device "source address". Before a device has been configured for the first time, the factory default value may be stored in this memory location by the manufacturer. The factory default values may be used later by software programmed in one or more processors onboard the smart device to take appropriate actions under different vehicle operating conditions, locations of the smart device, ambient conditions, etc.

The one or more processors onboard the smart device may also be configured to monitor any fault conditions on both identifier input and identifier output signals via CAN (controller area network) messages. Even after configuration of a particular smart device, the smart device may continue to receive periodic identifier input signals transmitted as "heartbeat" signals, sent at regular intervals from the central controller. Each time a smart device receives a new identifier input signal from the next upstream device or central controller, the smart device may interpret the signal, and compare the signal to the function instance value already saved in memory. At any time a smart device receives an identifier input signal that does not match the function instance value stored in memory on the smart device, the device may self-correct and over-write the old stored function instance value if there is a discrepancy. The smart device may then store the new function instance value, add an incremental value to the stored value, and send the incrementally increased value to the next downstream device. In order for the devices to perform self-identification, each device may be connected in series in the daisy chain identification verification network, with the identifier output of a first device being connected to the identifier input of the second device. The identifier input of a second device in the daisy chain downstream of the central controller may then be incrementally increased and sent as an identifier output signal to a third device, and so on. Central controller 22 may be connected to the first downstream device 32 and may initiate a regular, repeating "heartbeat" signal that is transmitted downstream through the daisy chain identification verification network 30 to enable continued updating and correcting of the configuration of all of the devices connected in the daisy chain. The central controller may initiate the identification sequence by signaling the first device and telling it that it will be the "number #1" device in the chain, and this will start the self-identification and source address assignment for the rest of the devices connected in the daisy chain.

Central controller 22 may be configured to support the multiple nearly identical smart devices 32 connected to the CAN bus 26 and to the daisy chain identification verification network 30. Similar to the smart devices, the central controller may include a physical output that is compatible with the smart devices to communicate information or initiate the self-identification process for the rest of the devices. Similarly, the central controller may include a physical input that is configured to receive a feed-back signal from the last device in the daisy chain. The central controller may be configured to process an identification output signal from the last device in the daisy chain and interpret the received information using the same protocol as the smart devices. The central controller may also be configured to perform communication and other control functions, in addition to initiating the identifier input signal to the first device and monitoring the feed-back signal from the last device in the loop continuously even after all devices are configured with new function instance values and source addresses. The central controller may also monitor and report all related diagnostics in the daisy chain with regard to system configuration, device failures, device misplacement or misconnection in the loop, and device service replacement confirmation.

All of the smart devices may be configured to power up when the system is powered up, and undergo an initialization process. All of the devices may also be configured to initially set a "Scan-Flag" equal to "FALSE", which forces the devices to go through an initial configuration or "Source Address" check process. During the initial check process each device will check its "Source Address" value or "Function Instance Value". If a smart device determines that it has a factory default base address value, then that device knows that it has not been configured for operation. In this situation, the smart device may not connect to the CAN bus until an identifier input signal is received at the device and the device is appropriately configured. Typically the identifier input signals are very fast, and are received at each smart device in less than a second after being initiated by the central controller. The speed at which the smart devices can handle the identifier signals may also depend on the specific device's capabilities. After the central controller has initialized, the central controller may generate a predetermined identification input signal to device #1 (Device "A" at Location #1 in FIG. 1). The first device in the daisy chain of smart devices may receive an identifier input signal (i.e., a single pulse count) at the device's physical input and store the identifier input signal as a function instance value in a first nonvolatile memory location (overwriting the factory default function instance value). The device may be further configured to then use this value to obtain a new source address following one of two options.

In a first option, the device may be configured to use the stored function instance value and the factory default base address to communicate with the central controller and initiate an address arbitration process to obtain a valid and up-to-date source address. The device may then store the new source address received back from the central controller in a nonvolatile memory location (overwriting a factory default base address). This option may provide more flexibility for the system by enabling the central controller to control all address assignments and distribution for the entire system.

In a second option, the device may be configured to generate a new source address using a source address configuration module that is configured to automatically determine a new source address for the device without any intervention from the central controller. In this option, the device may be configured to use the received function instance value or location number and add it to the factory default base address to come up with a new unique source address, and store the new source address in a nonvolatile memory location (over-writing the factory default base address). This option is preferred in less complex devices such as smart sensors with less complex electronics.

After determining its own function instance value and source address, the smart device may be configured to add an incremental value to its function instance value. In one example the identifier output signal sent from the smart device downstream to the next device may become a two pulse count. In other words, the identifier output signal sent from the first downstream smart device to the second downstream smart device may be generated by the first downstream device as the function instance value of the first smart device plus one incremental value ($1^{st}$ device function instance value +1), which then becomes the identifier input signal received at the physical input terminal on the second downstream device. The second device may also use one of the two options discussed above to generate or obtain a unique source address. This process continues with each device in the daisy chain identification verification network until all of the interconnected devices in the system have been configured with new, unique source addresses.

It may be important in many application that use multiple identical or essentially indistinguishable smart devices interconnected on the same CAN bus, that each of the devices can be associated with the actual location where the device is connected. One example where it may be important to know at all times that information received from a smart device is actually information associated with a particular physical location may include a system configured to employ 20 identical CAN-based smart temperature sensors to monitor the 20 exhaust temperatures of a 20-cylinder engine. The exhaust temperatures may be monitored, for example, to detect engine exhaust valve failure. The system may be initially configured so that the central controller is able to identify the information received from each smart device as information associated with the source address of each smart device (e.g., source address "xx" is associated with the smart temperature sensor measuring exhaust temperature at cylinder #5). However, during a service or while trouble-shooting the system, one or more of the smart devices may be accidentally swapped and placed at a different location. In this situation the swapped sensor will be reporting temperatures that the central controller now associates with the wrong cylinder. As long as the smart device has a valid source address, the central controller (main ECU for the vehicle) in known monitoring systems would not be able to tell that a particular device had been placed into a different location. Therefore, the central controller would not know that the misplaced or misconnected device is now reporting temperatures for a new location where the device was accidentally installed, rather than for the original location associated with the source address of that device.

In various exemplary embodiments of a system in accordance with this disclosure, the problem of correctly associating information that is received from a smart device with the current location of that smart device at any point in time is solved by continually sending "heartbeat" identifier signals from the central controller downstream the daisy chain identification verification network to each of the smart devices that are also connected to the CAN bus. The heartbeat identifier signals are continued even after the entire system has been configured. Each smart device may be configured to receive the identifier input signals and verify each time the signal is received that the device is still reporting information for an expected location by comparing the received identifier input signal with the function instance value stored in memory on the smart device. If there is a mismatch between the identifier input signal received from the next upstream device and the stored function instance value on a particular device, then the particular device may be reconfigured to automatically reassign the correct function instance value associated with the actual location of the device, and also correct the source address for the device using one of the two options discussed above.

When the system is powered up, the central controller may be configured to perform an initialization process, and then check the status of a flag that is stored in nonvolatile memory (i.e., "Setup_Completed" Flag). The central controller may be configured to follow one of the two following procedures: If the status of the "Setup_Completed" flag indicates that the system has not been configured yet, the central controller may be configured to start a timer (Check Timer). The threshold period of time set on the timer may be any reasonable value depending on system speed and capabilities, e.g., 1-2 seconds. The central controller may then start the process by initiating an identifier input signal to the first device downstream from the central controller in the identification verification network. After all of the smart devices in the loop have received an identifier input signal, and updated their respective function instance values and source addresses, the central controller then receives a feed-back signal from the last device in the loop. The central controller may be configured to interpret the feed-back signal, and based on information stored by the central controller or retrievable by the controller, determine whether the expected number of devices in the system have reported, thereby confirming the successful configuration of the entire system. After successful completion of the system configuration, the central controller may set the status flag in nonvolatile memory (i.e., "Setup_Complete" Flag=True) to indicate that the system is configured. Once the system has been properly configured each of the smart devices begins its normal process of transmitting data and diagnostics over the CAN bus to the central controller, and the central controller continues monitoring the heartbeat signal feed-back from the identification verification network. If the timer (Check Timer) times out and the central controller has not received the expected feed-back signal, then either some of the devices are faulty or there is an interconnection problem. Therefore, the central controller may also be configured to transmit an appropriate error or warning message that will inform an operator of the system status.

If the status flag ("Setup_Complete" Flag) indicates that the system has been configured previously, the central controller may be configured to then proceed with normal operations along two parallel paths or loops. Along one loop, the central controller may be configured to gather data by communicating with the devices and receiving data and diagnostics from each of the smart devices over the CAN bus according to programmed functions based on specified loop timing or transmission rates. The central controller may also be configured to initiate the repeating identifier heartbeat signals along a parallel loop. During operation of the heartbeat loop, if the central controller does not receive a heartbeat signal, it may be indicative of one or more device failures or faulty wiring in the identification verification network. The central controller may be configured to use the CAN bus to broadcast a global message to all devices on the bus to use their existing or last known source address to communicate. This feature allows all other operational smart devices to continue their function. Meanwhile, the central controller may generate a fault code and request maintenance for the fault condition. The combination of the messages sent over the CAN bus and the heartbeat signals sent over the identification verification network enables the central controller to pinpoint single failures and multiple faults of the smart devices in the system.

INDUSTRIAL APPLICABILITY

Figure 2:
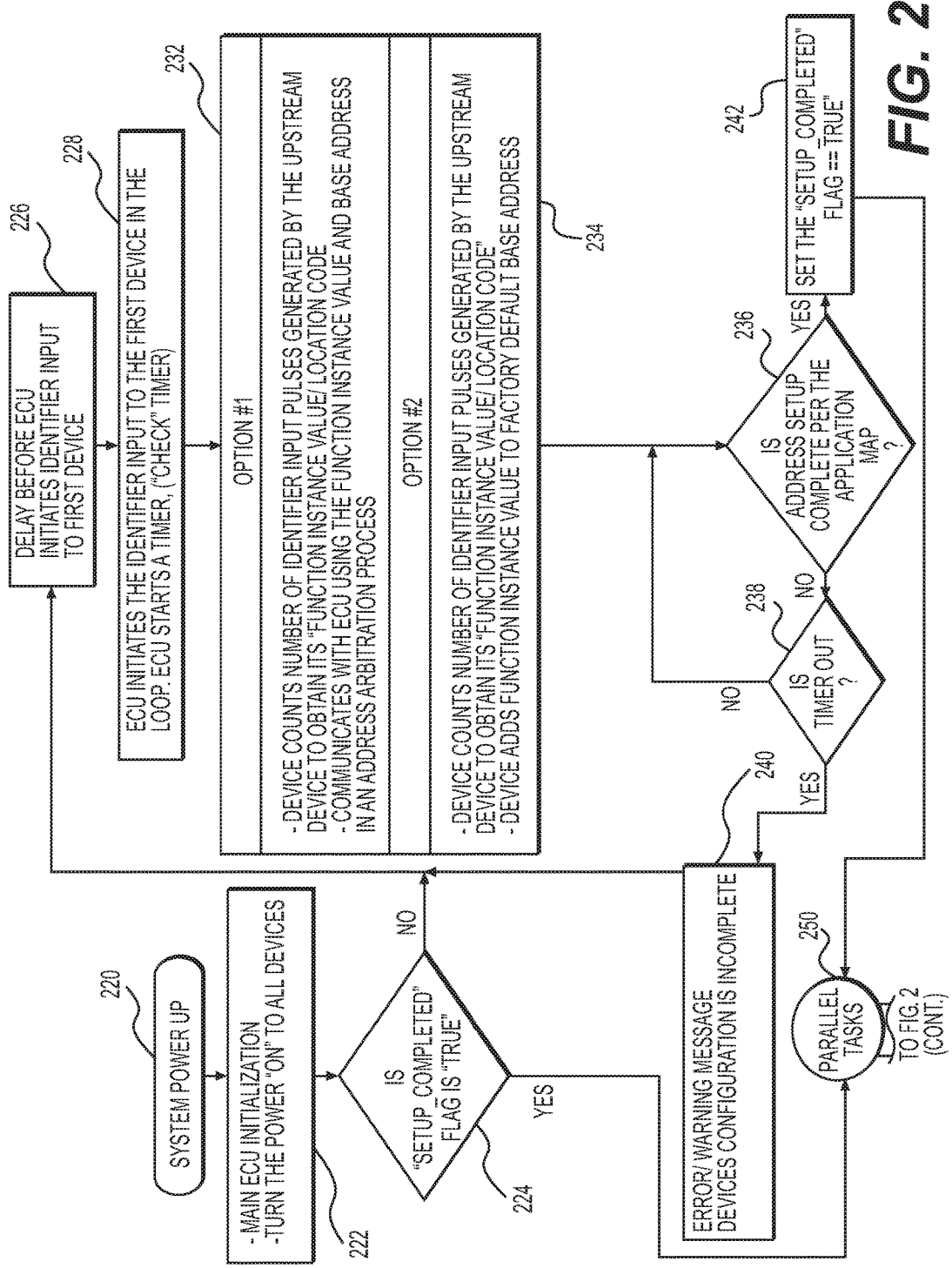
FIG. 2 is a flowchart illustrating an exemplary algorithm performed by a central controller according to this disclosure.
Figure 2:
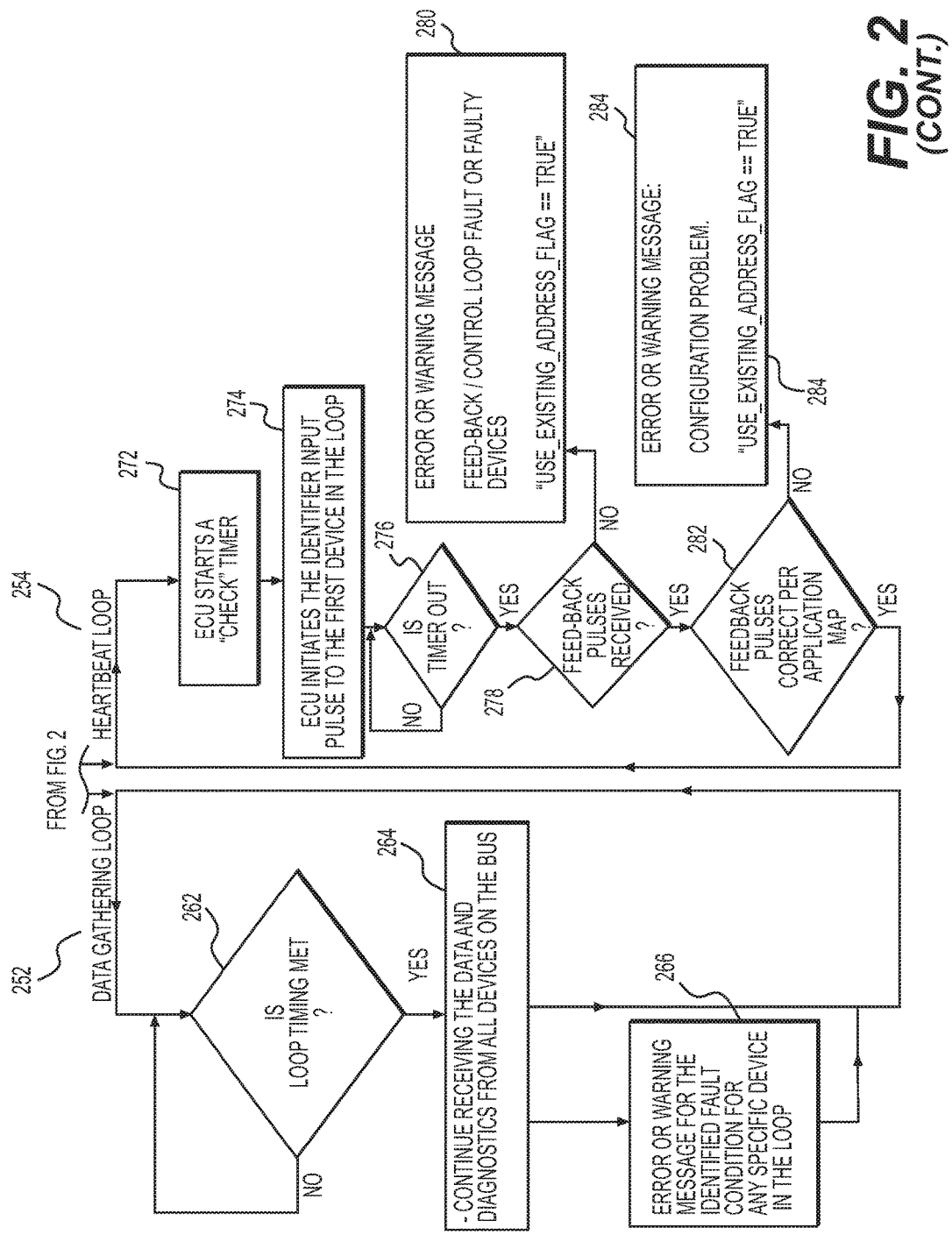

The system and methods of the present disclosure may have wide application in a variety of situations where there is a need to employ multiple, essentially identical smart devices at a number of different locations on a vehicle and continually monitor that each smart device is actually located and sending data from its expected location on an application map. FIG. 2 illustrates one exemplary algorithm in accordance with this disclosure that may be implemented by one or more processors included in a central controller that is part of the system and that performs at least two parallel tasks of gathering data from the smart devices and continually monitoring that the actual location of each smart device is where it is expected.

As shown in FIG. 2, an exemplary algorithm performed by one or more processors of the central controller may start at Step 220 with powering up the system. At Step 222, the central controller, which in the exemplary embodiment of FIG. 2 may be an electronic control unit (ECU) for a vehicle, may initialize the system by turning power on to all of the smart devices that are serially connected in the daisy chain of the identification verification network (designated 30 in FIG. 1). Upon initialization of the system, at Step 224 central controller 22 may determine whether a "Setup_Completed" flag is "True". The "Setup_Completed" flag will have been stored in a nonvolatile memory already if at least one complete identification and configuration cycle has already been successfully performed for all of the smart devices connected to the central controller through the CAN bus and to each other and the CAN bus through the daisy chain identification verification network. If the central controller determines that the Setup_Completed flag is True (Step 224: Yes) then the central controller can proceed to performing at least two parallel tasks, starting at Step 250. The at least two parallel tasks may include a data gathering loop 252 and a "heartbeat" loop 254, which is characterized by continuing to regularly perform a check of all of the smart devices and their interconnections by repeatedly initiating the communication of an identifier input signal to the first smart device in the daisy chain of the identification verification network.

In the data gathering loop 252, at Step 262 the central controller may determine whether the amount of time elapsed during completion of one loop for receiving data from all of the connected smart devices falls within an expected length of time for completing the loop. An indication that it took longer than expected to receive data from all of the smart devices connected to the central controller through the CAN bus may provide a warning that one or more smart devices or their interconnections has experienced a fault. At Step 264 in the data gathering loop 252, the central controller may continue to receive data and diagnostics from all of the devices connected to the CAN bus, and associate the data from each smart device with a particular location on an application map. In one example, Step 264 may include determining which source address from a particular smart device belongs to a particular measured cylinder temperature or pressure, where the temperature and/or pressure data is provided by a smart sensor positioned in a cylinder of an engine on a vehicle. The central controller may also determine from the received data whether a particular probe or sensor is experiencing a fault, such as may be caused by a short to ground or an open circuit. Upon determining that a potential fault exists at any of the smart devices, an error or warning message may be generated at Step 266 for an identified fault condition for any specific device in the loop.

The central controller may simultaneously perform the "heartbeat" loop 254 by initiating a "Check" timer for a predetermined amount of time at Step 272, which may control how frequently the central controller will send out a new identifier pulse to the first smart device in the daisy chain loop of the identification verification network. In one example, the central controller may initiate a new identifier pulse every second. At Step 274, the central controller (an ECU in the case of a vehicle) may initiate a new identifier pulse to the first smart device in the loop, and at Step 276, may check whether the predetermined amount of time on the Check timer has elapsed (Step 276: Yes). If the amount of time has not elapsed (Step 276: No) the central controller continues to monitor the amount of time from the last initiation of a new identifier pulse. After initiation of a new identifier pulse at Step 276, the central controller may then check whether a feedback pulse has been received at Step 278. If a feedback pulse has not been received (Step 278: No), the central controller may generate an error or warning message at Step 280, indicating that there is a potential fault in the feed-back or control loop of the identification verification network, or a potential faulty device in the loop. The central controller may identify a fault condition based on data received from a smart device over the CAN bus. If the data from a device is received as expected for a particular device location on the application map, then the controller may determine that the device is not faulty, but there may be a fault condition in the feedback loop of the identification verification network. If data is not received for a particular location on the application map, then the controller may determine that the device is faulty. After determining that a particular device is not faulty, the central controller may broadcast a global message setting a flag for the device as "USE-Existing-Address-Flag==True". This may allow the system to continue monitoring the parameter measured by that particular device based on data received from the device over the CAN bus even though the heartbeat loop reveals a problem in the identification verification network.

If a feedback pulse has been received (Step 278: Yes), then at Step 282 the central controller may determine whether the feedback pulses received from the identification verification network are correct as identified on an application map. An indication of the correct number or type of feedback pulses expected for the application map (Step 282: Yes) results in a return to the beginning of the heartbeat loop at Step 272. An indication that the number or type of feedback pulses is not correct (Step 282: No) may result in another error or warning message at Step 284, indicating that at least one of the smart devices is not configured properly, and may be reporting data from an incorrect location or wrong function instance number. This type of error may result when a smart device previously configured to report data from a first particular location on the application map is accidentally misconnected at a different location. A smart device in accordance with various embodiments of this disclosure will normally be able to automatically self-correct its function instance number and source address if the device is accidentally positioned at the wrong location on an application map. The device will perform this self-correction by resetting and saving a function instance value based on the next new identifier input signal received from the smart device or central controller that is connected immediately upstream of the misconnected smart device. The heartbeat loop 254 continues to repeat initiation of identifier pulses from the central controller to the first device downstream from the central controller in the identification verification network such that at any time a smart device may be replaced or accidentally misconnected in the wrong position, the device will automatically reconfigure to the correct function instance value as soon as the next new identifier input signal is received. As when generating an error or warning message at Step 280, at Step 284, if the central controller determines that a particular device is not faulty based on receipt of expected parameter data, the central controller may broadcast a global message setting a flag for the device as "USE-Existing-Address-Flag==True". This may allow the system to continue monitoring the parameter measured by that particular device based on data received from the device over the CAN bus even though the heartbeat loop reveals a problem in the identification verification network.

After the system has been powered up at Step 220, and at Step 222 the central controller has turned power on to all of the smart devices that are serially connected in the daisy chain of the identification verification network (designated 30 in FIG. 1), at Step 224 central controller 22 may determine that a "Setup_Completed" Flag is not "True" (Step 224: No). If the "Setup_Completed" Flag is not true, the central controller may proceed to Step 226 and impose a delay (500 ms in the example illustrated in FIG. 2) before initiating the first identifying pulse to the first device in the daisy chain immediately downstream of the central controller. At Step 228, the central controller initiates the first identifying pulse after power up of the system, sending the identifying pulse to the physical input of the first smart device. The first smart device may then follow one of two alternative courses of action at either Step 232 or Step 234. In a first option at Step 232, each device connected to the central controller in the daisy chain of the identification verification network may count the number of identifier input pulses generated by the next upstream device (or controller) and received at the physical input of the device, and then store this value as the function instance value (or location code) for the device in a first non-volatile memory location on the device. The device may then use this function instance value and a factory base address to communicate with the central controller. The central controller may use this information received from one or more of the devices and implement an address arbitration process to generate a new source address for the device. The device may receive this new source address from the central controller and store the new source address in a second non-volatile memory location.

In a second option at Step 234, one or more devices connected to the central controller in the daisy chain of the identification verification network may automatically count the number of identifier input pulses generated by the next upstream device (or controller) and received at the physical input of the device, store this number as the device function instance value in a first non-volatile memory location, and then generate a new source address without involving the central controller by adding its default factory programmed base address to the saved device function instance value. The device may then store this new source address in a second memory location on the device.

After all of the smart devices have completed either the first option at Step 232 or the second option at Step 234, the central controller may then proceed to Step 236 and determine whether all of the smart devices indicated on an application map have completed their source address setups in accordance with one of the options discussed above. If source address setup for all of the devices on the application map have not been completed (Step 236: No), then at Step 238, the central controller may check the total amount of elapsed time since first initiating the first identifier input pulse to the first device in the loop. If the elapsed time exceeds a threshold amount of time (Step 238: Yes) then an error or warning message may be generated at Step 240 indicating that the device configuration is incomplete and the feedback loop of the identification verification network may require trouble shooting to determine whether any of the interconnections between the devices or between a device and the central controller are faulty. If the source address setup for all of the devices on the application map have been completed (Step 236: Yes), then the central controller may set the "Setup_Completed" Flag=True at Step 242, and the central controller may proceed to the at least two parallel tasks discussed above at Step 250.

Figure 3:
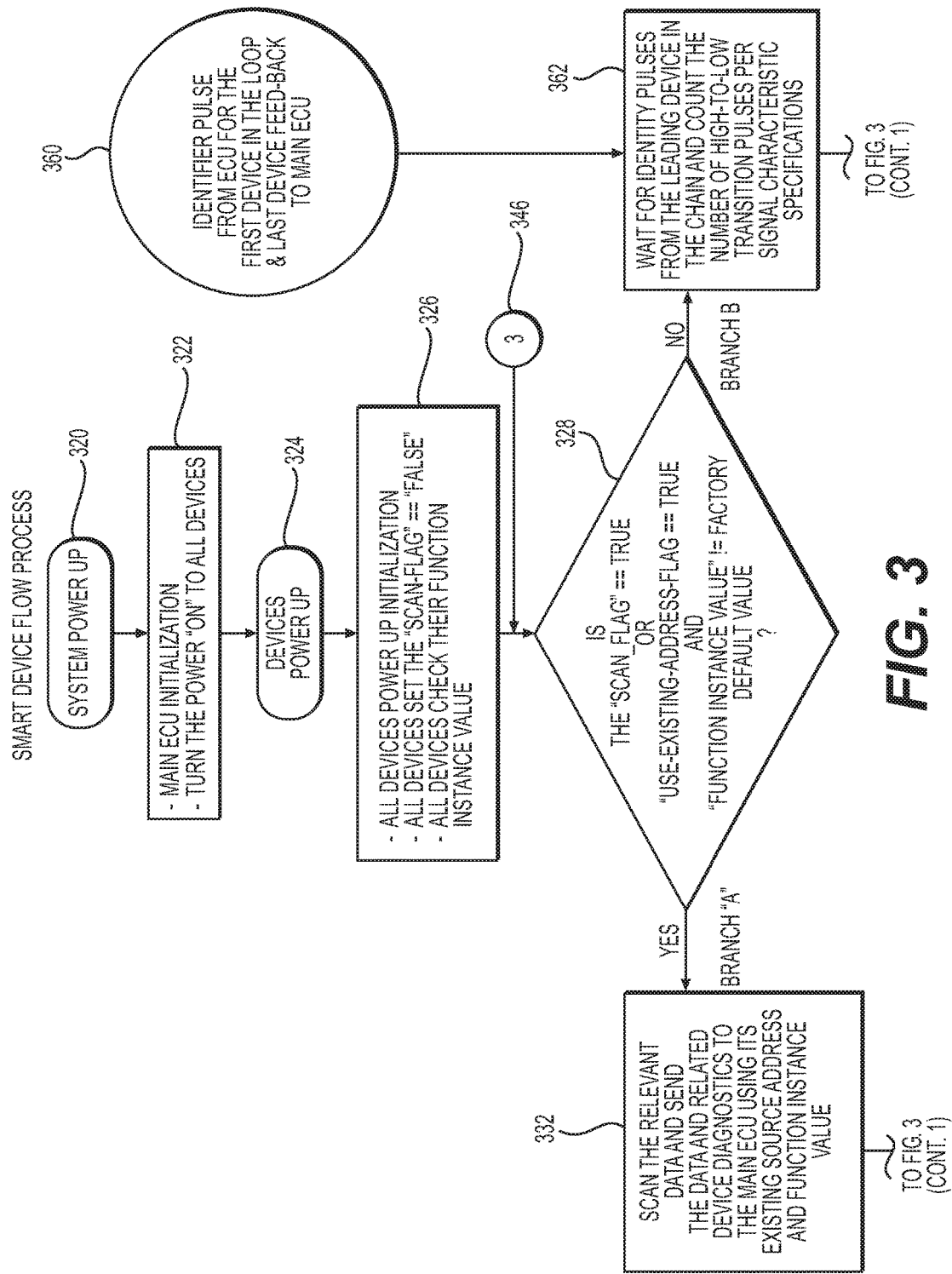
FIG. 3 is a flowchart illustrating an exemplary algorithm performed by a smart device according to this disclosure.

As shown in FIG. 3, an exemplary algorithm performed by one or more processors of each smart device may also begin at system power up (Step 320). At Step 322, the central controller (e.g., the ECU of a vehicle) may initialize the system by turning power on to all of the smart devices that are serially connected in the daisy chain of the identification verification network (designated 30 in FIG. 1). The devices are all powered up at Step 324, and each of the devices may undergo initialization. At power up initialization each device may set "Scan_Flag"="False" at Step 326 such that all of the devices are forced to undergo an initial system set up initiated by the central controller, as described above with reference to FIG. 2. All of the devices check their function instance values (location codes), which are determined from the identifier input signals received from an immediately upstream device or, in the case of the first device in the daisy chain, from the central controller, and stored in a first memory location on each device.

At Step 328, after all of the devices have been powered up and initialized, each device may then check whether the "Scan_Flag"=True, indicating that the function instance value for the device has already been updated from a factory default value based on an identifier input signal received from an upstream device or the central controller. Alternatively, the device may check whether a "USE_Existing_Address_Flag"=True and the function instance value is not the factory default value, indicating that there is a fault condition in the heartbeat signal, but the device has already been properly configured in the identification verification network. The device is communicating an expected parameter value over the CAN bus to the central controller. If either the "Scan_Flag"=True, or the "USE_Existing_Address_Flag"=True and the function instance value is not the factory default value (Step 328: Yes) then the device proceeds to Branch A and begins to perform normal data collection, communication, and diagnostics after the initial configuration. However, if Step 328: No, then the device proceeds to Branch B and the device updates its function instance value (location code) and updates its source address if either the device has detected a mismatch in the location code, or the device is being configured for the first time.

In Branch A, at Step 332, each device scans the relevant data it is monitoring (e.g., the temperature in a particular cylinder of an engine as measured by a temperature sensor) and sends that data and any related device diagnostic information to the central controller. In this step each device uses its source address and function instance value so that the central controller can associate the data received with the proper location on the application map. At Step 334 each device is also receiving identifier input signals continuously from the device connected immediately upstream in the daisy chain identification verification network. As described above, the identifier input signal that is received by the physical input of each device is an incrementally increased value from the immediately preceding device in the daisy chain. Each device compares the identifier input signal to the function instance value already stored on the device, and from that comparison can determine whether the device has either never been configured (with the factory default value still stored as its function instance value) or has been configured for a different location.

At Step 336, each device checks whether an identifier input signal has been received. If an identifier input signal has not been received (Step 336: No), the device may issue an error or warning message indicating that there may be a fault condition at the physical input of the device or at any upstream device, which may be preventing the identifier input signal from being received. Nevertheless, as long as the device is able to communicate data regarding the parameter or function that the device is intended to monitor over the CAN bus to the central controller, the central controller may broadcast a global CAN message to all devices to set the flag for the device as "USE_Existing_Address_Flag"=True. This will allow the device to continue providing data on a monitored parameter or function even when there is a failure in the identification verification network.

If the identifier input signal has been received at a device (Step 336: Yes), then the device may check whether the number of identifier input signals (pulses) is the same as the function instance value already stored in a memory of the device. If the number of identifier input signals is the same as the function instance value for the device (Step 340: Yes) then the system knows that the device is positioned in the proper location on the application map, and data gathered and communicated by the device will be properly associated with the actual location of the device. However, if the number of identifier input signals is not the same as the function instance value for the device (Step 340: No) then at Step 342 the device will send a diagnostic code indicating that the device is in the wrong location because the actual location of the device is different than the function instance value (location code) stored in the device's memory. The device will then set the "Scan_Flag"=False at Step 344, and automatically proceed to Branch B at Step 346 to correct the function instance value and source address for the device. As described above, the central controller will continue to provide a heartbeat verification signal at Step 360 by continuing to regularly communicate an identifier input signal from the central controller to the first device in the loop of the identifier verification network. As shown in Branch B of FIG. 3, correction of the function instance value and source address for a mismatched device is performed in Steps 362, 364, 366, and 368. At Step 362, the device waits until receiving an identifier input signal from the leading device in the daisy chain of the identifier verification network, and counts the number of pulses or other signal characteristics representative of how many upstream devices lie between the device and the central controller. At Step 364, the device determines whether receipt of the identifier input signal is complete, and at Step 366, the device determines whether the number of identifier input signals (pulses) is the same as the function instance value (location code) stored in the device's memory. At Step 368, the device stores the number of identifier input signals as the device function instance value in a non-volatile memory, overwriting either a factory default value or an incorrect function instance value that may result from the device having been accidentally relocated to a different location from the location it was originally configured for. As explained above, the device may follow one of two options in order to determine and store a new source address. One option followed by a device may include the device using its function instance value and factory default base address to communicate with the central controller so that the central controller may perform a source address arbitration process and return a new source address to the device. The other option may include the device simply adding its function instance value to the factory default base address without involving the address arbitration process performed by the central controller.

At Step 370, each device may incrementally increase the number of received pulses or other identifier input signals and then communicate that incrementally increased value downstream to the next device in the daisy chain. At Step 372, the device may then set the "Scan_Flag"==True, indicating that the device has been configured for its actual location in the daisy chain of the identification verification network. Finally, at Step 374, each properly configured smart device may start scanning and transmitting data and diagnostic information from its location to the central controller in association with the device's new source address.

It will be apparent to those skilled in the art that various modifications and variations can be made to the system and methods of the present disclosure without departing from the scope of the disclosure. Other embodiments will be apparent to those skilled in the art from consideration of the specification and practice of the system and methods disclosed herein. It is intended that the specification and examples be considered as exemplary only, with a true scope of the disclosure being indicated by the following claims and their equivalents.

What is claimed is:

1. A system for communicating over a Controller Area Network (CAN) bus, the system comprising:
   a central controller;
   a plurality of smart devices communicatively coupled with the central controller over the CAN bus and over an identification verification network separate from the CAN bus,
      each smart device being configured to at least one of measure various parameters and control a function based on a command received from the central controller, and then communicate one or more signals indicative of at least one of the measured parameters and the function over the CAN bus to the central controller, and
   each smart device of the plurality of smart devices including:
      a physical input;
      a physical output; and
      at least two nonvolatile memory locations, a first of the at least two memory locations being configured to store an identifier input signal received at the physical input from at least one of the central controller and another one of the plurality of smart devices over the identification verification network, the identifier input signal being stored by the smart device as a function instance value for the smart device, and the smart device further including a source address determination module configured to determine a source address for the smart device based on the function instance value and a factory default base address for the smart device, and store the source address in a second of the at least two memory locations.

2. The system of claim 1, wherein the source address determination module, for at least one of the plurality of smart devices, communicates the function instance value and the factory default base address over the CAN bus to the central controller, the central controller undergoes a source address arbitration process to generate a new source address for the smart device, and the at least one of the plurality of smart devices receives and stores the new source address generated by the central controller in the second of the at least two memory locations.

3. The system of claim 2, wherein the at least one of the plurality of smart devices is further configured to add an incremental value to its function instance value and communicate a resulting incrementally increased function instance value as a new identifier input signal through the physical output of the at least one of the plurality of smart devices physical output to a physical input of at least one of a successive smart device connected directly downstream of the at least one of the plurality of smart devices and a physical input of the central controller.

4. The system of claim 1, wherein the source address determination module for at least one of the smart devices automatically generates a new source address for the at least one of the smart devices by adding the function instance value to the factory default base address and stores the resulting new source address in the second of the at least two memory locations.

5. The system of claim 4, wherein the at least one of the plurality of smart devices is further configured to add an incremental value to its function instance value and communicate a resulting incrementally increased function instance value as a new identifier input signal through the physical output of the at least one of the plurality of smart devices physical output to a physical input of at least one of a successive smart device connected directly downstream of the at least one of the plurality of smart devices and a physical input of the central controller.

6. The system of claim 1, wherein the central controller is connected in a daisy chain arrangement to the plurality of smart devices such that the identification verification network includes the central controller and all of the smart devices wired together in sequence to form a single loop.

7. The system of claim 6, wherein the central controller is configured to initiate a setup for the system by sending one or more identifier pulses as an identifier input signal to the physical input of a first smart device, of the plurality of smart devices, connected to the central controller in the loop to be stored in the first of the at least two memory locations of the first smart device as the function instance value for the first smart device.

8. The system of claim 6, wherein the central controller is configured to perform at least two parallel tasks at the same time, wherein:
one of the at least two tasks is repeated on a regular, continuing basis by repeatedly resending an identifier input signal to the physical input of a first smart device, of the plurality of smart devices, connected to the central controller in the loop and receiving an identifier output signal from the physical output of the last smart device connected to the central controller in the loop to identify any faults, correct or report any faults, and check that all of the smart devices are reporting for a correct location; and
a second one of the at least two tasks includes continually receiving data and diagnostics from all of the smart devices and associating the received data and diagnostics with predetermined locations on an application map.

9. The system of claim 8, wherein the controller is configured to monitor an elapsed time after one of initiating a setup for the system and sending an identifier input signal, and flag a fault code when one or more smart devices do not receive an identifier input signal after a threshold period of time following the sending of the identifier input signal.

10. A method of identifying and configuring smart devices communicatively coupled to a central controller over a common CAN bus, the method comprising:
connecting the smart devices together and to the central controller in series to form a daisy chain identification verification network separate from the CAN bus, each of the smart devices being configured for at least one of measuring various parameters and controlling a function based on a command received from the central controller;
communicating one or more signals indicative of at least one of the measured parameters and the function from the smart devices over the CAN bus to the central controller;
storing an identifier input signal received at a physical input of each of the smart devices from at least one of the central controller and another one of the smart devices over the identification verification network, the identifier input signal being stored by each smart device in a first memory location of the smart device as a function instance value for the smart device;
determining a source address for each smart device using a source address determination module by determining the source address for the smart device based on the function instance value stored in the first memory location and a factory default base address for the smart device; and
storing the source address in a second memory location of the smart device.

11. The method of claim 10, wherein determining a source address for each smart device includes:
communicating the function instance value for at least one of the smart devices and the factory default base address for the smart device over the CAN bus to the central controller;
performing a source address arbitration process using the central controller to generate a new source address for the at least one of the smart devices;
receiving the new source address from the central controller at the at least one of the smart devices; and
storing the new source address generated by the central controller in the second memory location.

12. The method of claim 10, wherein determining a source address for each smart device includes:
automatically generating a new source address for at least one of the smart devices by adding the function instance value for the at least one of the smart devices to the factory default base address for the at least one of the smart devices using a processor on the at least one of the smart devices; and
storing the new source address in the second memory location.

13. The method of claim 11, further including:
adding an incremental value to a function instance value, of at least one of the smart devices, stored in the first memory location; and
communicating the resulting incrementally increased function instance value as a new identifier input signal through the physical output of the at least one of the smart devices to a physical input of at least one of a successive smart device connected directly downstream of the at least one of the smart devices and a physical input of the central controller.

14. The method of claim 12, further including:
adding an incremental value to a function instance value, of at least one of the smart devices, stored in the first memory location; and
communicating the resulting incrementally increased function instance value as a new identifier input signal through the at least one of the smart devices physical output to a physical input of at least one of a successive smart device connected directly downstream of the at least one of the smart devices and a physical input of the central controller.

15. The method of claim 10, further including:
initiating a setup for the system by sending one or more identifier pulses from the central controller as an identifier input signal to the physical input of a first smart device, of the smart devices, connected to the central controller in a daisy chain; and
storing the identifier input signal in one of at least two memory locations of the first smart device as the function instance value for the first smart device.

16. The method of claim 15, further including:
performing at least two parallel tasks at the same time using the central controller, wherein:
one of the at least two tasks is repeated on a regular, continuing basis by repeatedly resending an identifier input signal to the physical input of the first smart device connected to the central controller in the daisy chain and receiving an identifier output signal from a physical output of a last smart device connected to the central controller in the daisy chain to identify any faults, correct or report any faults, and check that all of the smart devices are reporting for a correct location; and
a second one of the at least two tasks includes continually receiving data and diagnostics from all of the smart devices and associating the received data and diagnostics with predetermined locations on an application map.

17. The method of claim 16, further including monitoring an elapsed time after one of initiating the setup for the system and resending an identifier input signal, and flagging a fault code when one or more smart devices do not receive an identifier input signal after a threshold period of time following the setup initiation and the resending of the identifier input signal.

18. A method of automatically identifying and correcting at least one of a fault or a misconnection in one or more of a plurality of smart devices communicatively coupled to a central controller over a common CAN bus, the method comprising:
   connecting the smart devices together and to the central controller in series to form a daisy chain identification verification network separate from the CAN bus, each of the smart devices being configured for at least one of measuring various parameters and controlling a function based on a command received from the central controller;
   communicating one or more signals indicative of at least one of the measured parameters and the function from the smart devices over the CAN bus to the central controller;
   storing an identifier input signal received at a physical input of each of the smart devices from at least one of the central controller and another one of the smart devices over the identification verification network, the identifier input signal being stored by each smart device in a first memory location of the smart device as a function instance value for the smart device;
   determining a source address for a first smart device of the smart devices using a source address determination module by determining the source address for the first smart device based on the function instance value stored in the first memory location and a factory default base address for the first smart device;
   storing the source address in a second memory location of the first smart device;
   repeatedly resending an identifier input signal from the central controller to the physical input of the first smart device connected to the central controller in the daisy chain and receiving an identifier output signal from a physical output of a last smart device connected to the central controller in the daisy chain to identify any faults, correct or report any faults, and check that all of the smart devices are reporting for a correct location; and
   monitoring, with the central controller, an elapsed time after sending an identifier input signal from the central controller to the first smart device, and flagging a fault code when one or more smart devices do not receive an identifier input signal within a threshold period of time.

19. The method of claim 18, wherein determining a source address for the first smart device includes:
   communicating the function instance value for the first smart device and the factory default base address for the smart device over the CAN bus to the central controller;
   performing a source address arbitration process using the central controller to generate a new source address for the first smart device;
   receiving the new source address from the central controller at the first smart device; and
   storing the new source address generated by the central controller in the second memory location of the first smart device.

20. The method of claim 18, wherein determining a source address for the first smart device includes:
   automatically generating a new source address for the first smart device by adding the function instance value for the first smart device to the factory default base address for the first smart device using a processor on the first smart device;
   storing the new source address in the second memory location;
   adding an incremental value to each smart device function instance value stored in the first memory location; and
   communicating a resulting incrementally increased function instance value as a new identifier input signal through a physical output of the first smart device to a physical input of at least one of a successive smart device connected directly downstream of the first smart device and a physical input of the central controller.

* * * * *